US006220791B1

(12) United States Patent
Hutchins

(10) Patent No.: US 6,220,791 B1

(45) Date of Patent: Apr. 24, 2001

(54) APPARATUS AND METHOD FOR THE AEROSOLIZATION OF POWDERS

(75) Inventor: Darrell K. Hutchins, Conway, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 0 days.

(21) Appl. No.: 09/266,447

(22) Filed: Mar. 11, 1999

(51) Int. Cl.[7] .................................................... B65G 53/36

(52) U.S. Cl. .............................. 406/124; 406/88; 406/85; 406/124; 406/137; 406/144; 406/146; 239/8; 239/693; 239/310

(58) Field of Search ................................ 406/85, 88, 122, 406/124, 137, 144, 146, 51, 75, 174, 142; 239/8, 9, 10, 693, 699, 310, 338

(56) References Cited

U.S. PATENT DOCUMENTS 285,047 * 9/1883 Lewis .
727,030 * 5/1903 Tilghman .
968,350 * 8/1910 Harrison .
1,337,738 * 4/1920 Von Porat .
1,585,990 * 5/1926 Houghton .
1,718,507 * 6/1929 Wenzel et al. .
2,221,741 * 11/1940 Vogel-Jorgensen .
2,358,497 * 9/1944 Egloff .................................. 406/134
2,643,161 * 6/1953 Shirk .................................... 406/174
2,684,872 * 7/1954 Berg .................................... 406/124
2,715,551 * 8/1955 Kiernan .
2,724,617 * 11/1955 Hines .
2,779,510 * 1/1957 Wilson et al. .
2,841,101 * 7/1958 Hale et al. .
2,867,478 * 1/1959 Shale .
2,889,083 * 6/1959 Schwinhorst .
2,919,159 * 12/1959 Lacroix .
3,010,766 * 11/1961 Coski .
3,166,222 * 1/1965 Schrader .
3,261,379 * 7/1966 Stockel .
3,265,098 * 8/1966 O'Neal et al. .
3,479,093 * 11/1969 Hale .
3,746,254 * 7/1973 Duncan et al. ...................... 239/697
3,976,332 * 8/1976 Fabel ...................................... 406/14
4,036,531 * 7/1977 Rusterholz ............................. 406/50
4,116,367 * 9/1978 Kataoka et al. ...................... 2/146.4
4,260,298 * 4/1981 Zenz ..................................... 406/146
4,374,540 * 2/1983 Massey et al. ....................... 165/279
4,409,009 10/1983 Lissy .
4,580,727 4/1986 Moos .
4,586,386 5/1986 Hollstein et al. .
4,753,565 * 6/1988 Reimert et al. ...................... 414/221
4,770,344 9/1988 Kaiser .
4,815,414 * 3/1989 Duffy et al. ......................... 118/308
5,018,909 * 5/1991 Crum et al. .......................... 406/138
5,145,293 * 9/1992 Savino et al. ........................ 406/193
5,238,154 * 8/1993 Zuriel ............................. 222/189.06
5,372,309 12/1994 Ehle et al. .
5,489,166 * 2/1996 Schmit ................................ 406/137
5,654,042 8/1997 Watanabe et al. .
5,727,541 3/1998 Rowland .
5,743,958 4/1998 Shutic .
5,752,788 * 5/1998 Crum .................................... 406/29
5,839,669 * 11/1998 Borner et al. ........................ 239/704
6,068,702 * 5/2000 Bertellotti et al. ................... 118/621

* cited by examiner

*Primary Examiner*—Christopher P. Ellis
*Assistant Examiner*—Richard Ridley
(74) *Attorney, Agent, or Firm*—J. Charles Dougherty

(57) ABSTRACT

An apparatus and method for the aerosolization of powders is disclosed. The invention includes a chamber in which a cloud of aerosolized powder is formed, the cloud having a relatively even distribution of powder particles. A Bernoulli tube may be used to extract powder from the powder cloud when the powder cloud reaches its equilibrium height. Adjustment of the air flow rate into the Bernoulli tube may be used to control the flow rate of powder out of the disclosed device.

10 Claims, 1 Drawing Sheet

APPARATUS AND METHOD FOR THE AEROSOLIZATION OF POWDERS

BACKGROUND OF THE INVENTION

The present invention is directed to a system for aerosolizing powders for use in powder spray painting and other powder spray applications. In particular, the present invention is directed to a system for generating an air stream of aerosolized fine powder by forming a turbulent powder cloud from which powder is extracted, which results in a powder spray to a workpiece having a constant powder mass deposition rate.

A steady flow rate of unagglomerated powder particles from the powder spray device is essential to the formation of a smooth, uniform-thickness powder layer on the substrate to be painted in powder spray paint applications. Conventionally, fluidized beds or vibrating troughs have been used to feed powder into the powder spray system. For example, U.S. Pat. No. 5,745,954 to Shutic discloses a powder painting system including a fluidized powder bed. In the disclosed device, powder is fed into a powder feed hopper and falls to the fluidized bed at the bottom of the hopper. The fluidized bed is maintained through the use of pressurized air inlets in the floor of the hopper and rotating baffles. Suction tubes at the top of the hopper extract powder from the fluidized bed.

U.S. Pat. No. 5,654,042 to Watanabe et al. also discloses a powder coating system utilizing a fluidized bed. To improve performance of the device, Watanabe et al. also discloses the use of low-pressure gas pulses directed counter to the normal flow direction of the powder out of the hopper. These low-pressure gas pulses create microvibrations within the powder intake to alleviate adherence and cohesion among powder particles at the pump inlet.

Other prior art devices have attempted to solve the problem of uniform powder flow without fluidized beds. U.S. Pat. No. 5,752,788 to Crum discloses a powder spray device using a vaned impeller to distribute powder before it is delivered to a powder spray gun. The device includes a control system to adjust the rate at which powder is metered to the powder spray gun so that the mass of powder exiting to the powder spray gun remains relatively constant.

In addition, U.S. Pat. No. 4,116,367 to Kataoka et al. discloses an apparatus for supplying powder to a continuous metal casting mold. In this device, powder is fed down into a hopper with compressed air openings along its sides. The powder falls from the hopper through a hole in the bottom, and enters an intake section where the powder is pushed upward by air nozzles. The powder is then sent by a screw to a horizontal air nozzle, which pushes the powder toward the spray nozzle device.

None of these devices is completely satisfactory in operation for steady delivery of powders, and this problem remains as one of the primary difficulties in powder spray painting. In particular, these devices are unable to create a flow of powder in which powder is for the most part separated into individual particles prior to delivery of the powder to the powder sprayer.

SUMMARY OF THE INVENTION

The present invention overcomes the limitations of the prior art by creating a uniform cloud of powder from which powder is extracted and delivered to a spray gun or other aerosolized powder application. The powder is originally fed into a powder reservoir of the disclosed device. Compressed air is forced into the powder, thereby agitating the powder and creating a cloud of aerosolized powder that rises upwards on the air stream.

The powder passes through a hole in the top of the powder reservoir and enters a chamber connected to the powder reservoir. The chamber is shaped roughly as a funnel, with the diameter of the chamber generally increasing with height. As the aerosolized powder rises in the chamber, the air flow speed, and hence the upward air drag force on the powder particles, decreases due to the increasing diameter of the chamber. At some point, the air drag force on a powder particle becomes equal to the particle weight, and a cloud of powder collects in the chamber in the vicinity of this equilibrium height. It is believed that the formation of a powder cloud in the chamber is enhanced by the Bernoulli effect because the air pressure in the chamber increases with height as the air flow speed decreases. The resulting powder cloud is approximately stationary, internally turbulent, and has an approximately uniform space and time averaged mass density.

Aerosolized powder is extracted from the powder cloud by a Bernoulli tube which passes horizontally through the chamber at the equilibrium height of the cloud. Tests have shown that aerosolized powder consisting of single powder particles can be extracted from the device at a uniform rate. The rate of powder extraction can be varied simply by varying the air flow rate through the Bernoulli tube.

It is therefore an object of the present invention to provide a system for the aerosolization of powders using a turbulent powder cloud.

It is a further object of the present invention to provide a system for the aerosolization of powders that produces a uniform distribution of powder when the powder is distributed onto a substrate.

It is a still further object of the present invention to provide a system for the aerosolization of powders wherein single powder particles can be extracted from the system at a uniform rate.

Further objects and advantages of the present invention will be apparent from a consideration of the following detailed description of the preferred embodiments in conjunction with the appended drawing as briefly described following.

DETAILED DESCRIPTION OF THE PREFERRED EMBODIMENTS

Figure 1:
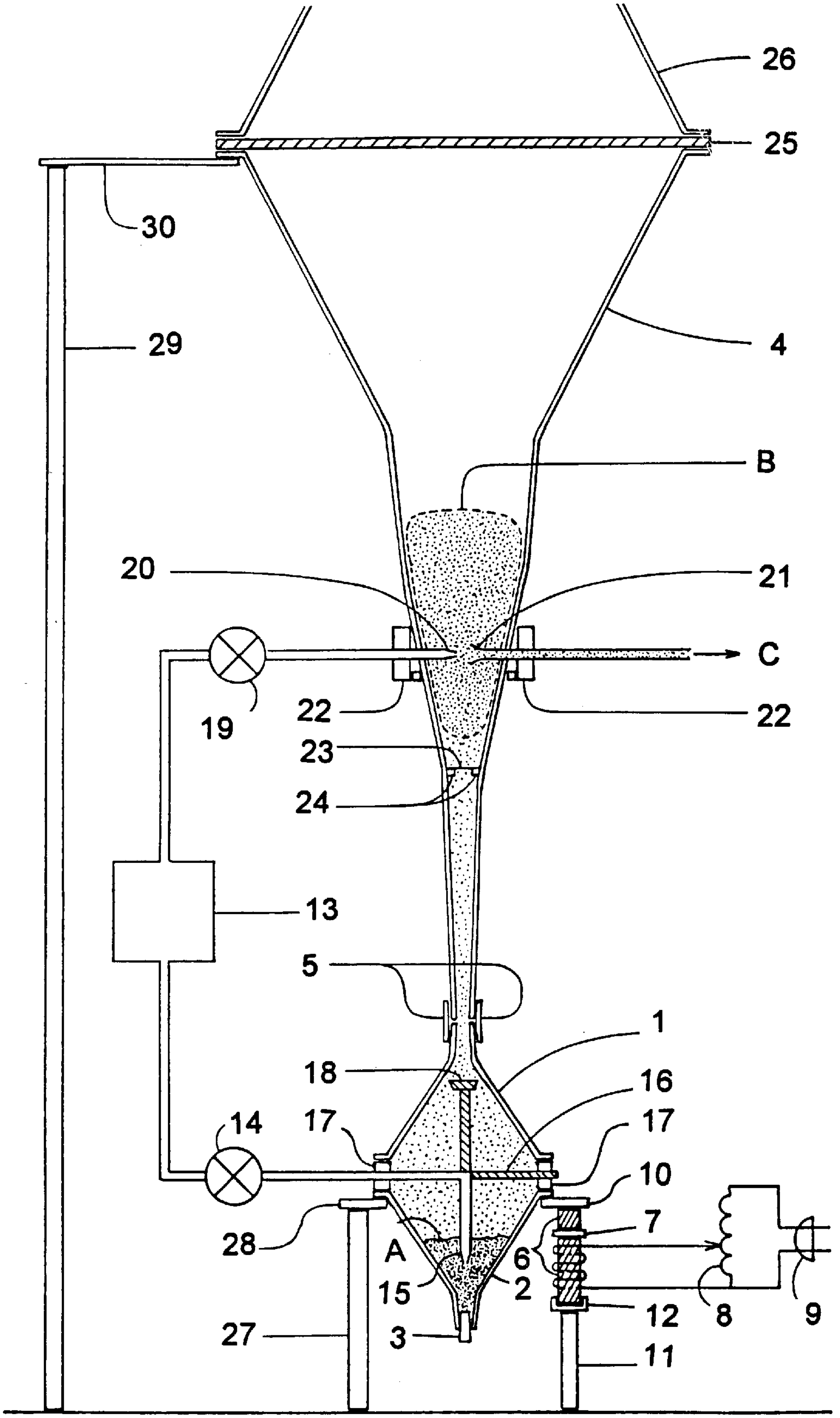
FIG. 1 is a cut-away elevational view of a preferred embodiment of the present invention.

Referring to FIG. 1, a preferred embodiment of the present invention is shown. A powder reservoir is defined by cap 1 and cup 2. In the preferred embodiment, cap 1 and cup 2 are shaped roughly as funnels, and are joined at their large ends and mounted with their symmetry axes oriented vertically. A plug 3 closes the lower end of cup 2; in an alternative embodiment, cup 2 may have no hole in its lower end in which case plug 3 is not required. Cup 2 may be partially filled with glass beads (not shown) to facilitate the agitation of dry powder loaded therein. Above cap 1 is chamber 4, which is connected to cap 1 by flexible coupling 5. Chamber 4 is mounted with its small end down and with its vertical symmetry axis aligned with cap 1 and cup 2. The diameter of chamber 4 increases with height, creating a roughly funnel-like shape.

In an alternative embodiment, the powder reservoir can be formed of a single piece of material. In another alternative embodiment, the entire powder reservoir and chamber assembly can be formed of a single piece of material. Also, although chamber 4, cap 1, and cup 2 in the preferred embodiment are made of an inexpensive plastic material, such as polyethylene, these parts could be made of conducting material. The use of a conductive material might serve to suppress tribocharging of powder particles due to agitation of powder in cap 1 and cup 2.

Electromagnetic vibrator 6 has upper and lower parts separated by elastic spacer 7. Vibrator 6 is powered by variac 8, and can be a mechanical vibrator of any conventional design. AC line plug 9 directs power to variac 8. Vibrator bracket 10 connects cup 2 to vibrator 6 so that the application of power to variac 8 will activate vibrator 6, which will in turn agitate cup 2. The lower part of vibrator 6 is fastened to support post 11 by means of bracket 12.

Compressed air source 13 delivers compressed air to lower valve 14, which controls the flow of air into lower nozzle 15 which is directed downward into cup 2. Support rod 16, secured in spacer ring 17, holds lower nozzle 15 firmly in place within cup 2. Baffle 18 is mounted above lower nozzle 15 within cap 1. Compressed air source 13 also directs air to upper valve 19. Upper valve 19 controls the flow of air into upper nozzle 20, which is directed horizontally into chamber 4. Opposite upper nozzle 20 in chamber 4 is flare 21, which receives the flow of air from upper nozzle 20. Upper nozzle 20 and flare 21 are supported by mounting brackets 22. In an alternative embodiment, lower nozzle 15 and upper nozzle 20 may be fed by separate compressed air sources. Also, any compressed gas could be substituted for air in the present invention.

Within chamber 4 is screen 23, which is supported by mounting ring 24. The mesh size of screen 23 will depend upon the particular powder used. At the top of chamber 4 is filter 25. Plenum 26 lies above filter 25, and is connected to a suction vent (not shown) that maintains a slight vacuum across filter 25. Additional mechanical support for the system is provided by support post 27, bracket 28, support post 29 and bracket 30. Plastic bolts and screws (not shown) are used to join parts of the system.

The operation of a preferred embodiment of the invention may now be described. Powder A is loaded into cup 2 simply by pouring it into the top of chamber 4 with filter 25 removed and lower valve 14 and upper valve 19 closed. In an alternative embodiment, a standpipe port could be added to cap 1 for more convenient powder loading. After powder A is loaded into cup 2, vibrator 6 is activated by applying power from AC line plug 9. Vibrator 6 agitates cup 2, thereby causing powder in cap 1 and cup 2 to settle continuously to the bottom of cup 2 during operation.

To create powder cloud B, first lower valve 14 is opened such that compressed air from compressed air source 13 is forced through lower nozzle 15 and into powder A in cup 2. The air stream from nozzle 15 agitates the central portion of powder A in cup 2 such that powder is projected violently against the walls of cap 1. Baffle 18 prevents powder from being projected directly into chamber 4, but the air stream must flow eventually out the upper end of cap 1 around baffle 18. Thus aerosolized powder is carried by the air flow stream upward through the bottom end of chamber 4 from cap 1.

As the aerosolized powder rises in chamber 4, the air drag force on entrained particles decreases as the air flow speed decreases. At some height, depending on the particle size and density, the air drag force on a given particle becomes equal to the particle weight. This stagnation results in the formation of powder cloud B, which is approximately stationary in chamber 4. It is believed that the formation of powder cloud B in an approximately stationary location is aided by the Bernoulli effect because the air pressure in chamber 4 increases with height as the air flow speed decreases.

The combination of the Bernoulli effect and the equilibrium between the particle weight and air drag force results in the formation and persistence of powder cloud B in chamber 4. With no powder being extracted, the average spatial density of particles in powder cloud B reaches an equilibrium state wherein more powder is prevented from entering the cloud from below because of the "weight" of the collective cloud particles exerted through collisions on particles rising below. In this state, an equilibrium exists between entry of additional particles from below and collection of particles from powder cloud B on the wall of chamber 4. Powder collected on the wall of chamber 4 trickles back down the wall, with this flow process being aided by the vibrations of chamber 4 due to its mechanical connection with vibrating cap 1 and cup 2. This powder reenters cup 2 or is reaerosolized in chamber 4. Also, screen 23 blocks any large particle agglomerates that may have entered chamber 4 around baffle 18. The agglomerates fall back into cup 2.

To extract aerosolized powder from powder cloud B in chamber 4, upper valve 19 is opened. Compressed air from compressed air source 13 then flows through upper valve 19 and then through upper nozzle 20, across a short air gap in chamber 4, and passes then to flare 21. Together, upper nozzle 20 and flare 21 form a Bernoulli tube passing horizontally through chamber 4 at the central height of powder cloud B. This Bernoulli tube causes the extraction of powder from powder cloud B through flare 21 and in the direction of arrow C. The rate of powder extraction from powder cloud B is controlled simply by varying the air flow rate to upper nozzle 20 with upper valve 19. When powder is being extracted from powder cloud B by flare 21, the corresponding reduction in the "weight" of powder cloud B allows the extracted powder to be replaced by powder particles rising from cup 2 so that the spatial density of particles in powder cloud B remains approximately the same. Thus it is possible to extract powder from powder cloud B at a uniform rate because of the self-regulating behavior of the powder cloud density.

Although most powder rising in chamber 4 from cup 2 collects in powder cloud B, turbulence causes some powder particles to continue rising to the top of chamber 4, especially the smaller, less dense particles. This relatively small amount of powder is removed from the air flow by filter 25 as the exhaust air flows out of the system with low speed into plenum 26 and is carried away by a weak suction vent at the top of the device (not shown).

One common problem in powder spray painting systems is that powder left in connecting hoses and other conduits at operation shutdown can contribute to uneven powder flow when the system is next activated. This problem may be avoided with the preferred embodiment of the present invention by first stopping air flow into cup 2 using lower valve 14, and then allowing the device to clean itself due to the air stream from upper nozzle 20. Upper valve 19 may be closed after an appropriate cleaning period. The device will then be clean immediately at the next startup.

I have verified the results described above by qualitative observations of the present invention in operation, and by powder deposition tests done with the invention used in conjunction with a powder sprayer. The powder deposition test results show that steady powder streams, relatively free of agglomerates, are routinely delivered to workpiece surfaces by the preferred embodiment of the present invention. The steadiness of the powder delivery rate is evidenced by the steadiness of the current carried to the workpiece by the generated charged powder stream. The largely agglomerate-free nature of the powder stream is verified by the study of photomicrographs of surfaces momentarily exposed to the powder stream.

It should be understood that the theories of operation provided herein may be incomplete or inaccurate without limiting the results described and the invention claimed below. The present invention has been described with reference to certain preferred and alternative embodiments which are intended to be exemplary only and not limiting to the full scope of the present invention as set forth in the appended claims.

What is claimed is:

1. An apparatus for the aerosolization of powders, comprising:

(a) a powder reservoir comprising an open top end;

(b) a chamber comprising an open bottom end, wherein said chamber is positioned above said powder reservoir such that said powder reservoir open top end and said chamber open bottom end are vertically aligned, and wherein said chamber is adapted to contain a powder cloud characterized by an equilibrium height, and said chamber comprises at least one section, wherein said section is characterized by a diameter, and the diameter of said section increases with height;

(c) an agitation means in communication with said powder reservoir;

(d) a powder extraction means within said chamber, wherein said powder extraction means is positioned at about the powder cloud equilibrium height; and (e) a baffle near said powder reservoir open top end wherein said baffle blocks the direct flow of powder from said powder reservoir into said chamber.

2. The apparatus of claim 1, wherein said agitation means comprises:

(a) a compressed gas source; and (b) a nozzle connected to said compressed gas source, wherein said nozzle is directed into said powder reservoir.

3. The apparatus of claim 1, wherein said powder extraction means comprises:

(a) a compressed gas source;

(b) a nozzle connected to said gas source, wherein said nozzle is directed into said chamber; and (c) a flare opposite said nozzle within said chamber.

4. The apparatus of claim 3, wherein said nozzle and said flare are spaced apart so as to create a short air gap between said nozzle and said flare.

5. The apparatus of claim 1, further comprising a vibrator mechanically connected to said powder reservoir.

6. An apparatus for the aerosolization of powders, comprising:

(a) a powder reservoir;

(b) a chamber in communication with said powder reservoir, wherein said chamber is adapted to contain a powder cloud characterized by an equilibrium height;

(c) an agitation means in communication with said powder reservoir;

(d) a powder extraction means within said chamber, wherein said powder extraction means is positioned at about the powder cloud equilibrium height;

(e) a plenum in communication with said chamber; and (f) a filter between said plenum and said chamber.

7. The apparatus of claim 6, further comprising a suction vent in communication with said plenum.

8. An apparatus for the aerosolization of powders, comprising:

(a) a powder reservoir;

(b) a chamber in communication with said powder reservoir, wherein said chamber is adapted to contain a powder cloud characterized by an equilibrium height;

(c) an agitation means in communication with said powder reservoir;

(d) a powder extraction means within said chamber, wherein said powder extraction means is positioned at about the powder cloud equilibrium height; and (e) a screen within said chamber between said powder reservoir and said powder extraction means.

9. A method for the aerosolization of powders, comprising the steps of:

(a) agitating a powder in a powder reservoir to create a rising powder cloud within a chamber while directing compressed gas into the powder reservoir and baffling the powder exiting the powder reservoir into the chamber such that the powder cannot flow directly between the powder reservoir and the chamber, wherein the powder cloud is characterized by an equilibrium height, and the chamber is in communication with the powder reservoir; and (b) extracting powder from the powder cloud using a powder extraction means positioned at about the powder cloud equilibrium height.

10. A method for the aerosolization of powders, comprising the steps of:

(a) agitating a powder in a powder reservoir to create a rising powder cloud within a chamber, wherein the powder cloud is characterized by an equilibrium height, and the chamber is in communication with the powder reservoir;

(b) extracting powder from the powder cloud using a powder extraction means positioned at about the powder cloud equilibrium height; and (c) removing from the chamber any powder particles that rise above the powder cloud equilibrium height utilizing a filter and a suction vent.

* * * * *